US006837355B2

(12) United States Patent
Matsui et al.

(10) Patent No.: US 6,837,355 B2
(45) Date of Patent: Jan. 4, 2005

(54) CLUTCH INCLUDING SPUN ROTOR HAVING HARDENED DEPRESSIONS

(75) Inventors: Shigeo Matsui, Toyohashi (JP); Masao Nakano, Jackson, MI (US); Masahito Ooya, Anjo (JP); Alice Schneider, Ceresco, MI (US); Peter Alderman, Parma, MI (US); Dean Bremke, Wellington, OH (US); Craig A. Wightman, Elyria, OH (US); Channing M. Suscha, Avon, OH (US); Daniel T. Pritchard, Westlake, OH (US)

(73) Assignees: Denso Corporation, Kariya (JP); Michigan Automotive Compressor, Parma, MI (US); A. J. Rose Mfg. Co., Avon, OH (US)

( * ) Notice: Subject to any disclaimer, the term of this patent is extended or adjusted under 35 U.S.C. 154(b) by 0 days.

(21) Appl. No.: 10/374,529

(22) Filed: Feb. 27, 2003

(65) Prior Publication Data

US 2003/0164277 A1 Sep. 4, 2003

(30) Foreign Application Priority Data

Feb. 28, 2002 (JP) ........................ 2002-053514

(51) Int. Cl.⁷ .............................................. F16D 27/14
(52) U.S. Cl. ............................. 192/84.961; 192/107 R
(58) Field of Search ..................... 192/84.961, 107 R, 192/107 M, 84.91, 84.96

(56) References Cited

U.S. PATENT DOCUMENTS

| 4,295,553 A | * | 10/1981 | Sayo et al. | ............ | 192/84.961 |
| 4,413,717 A | * | 11/1983 | Kanamaru et al. | ..... | 192/84.961 |
| 6,209,191 B1 | * | 4/2001 | Tabuchi et al. | ............ | 29/602.1 |

FOREIGN PATENT DOCUMENTS

| JP | A-S60-108130 | | 6/1985 |
| JP | 6249025 | * | 3/1987 |

\* cited by examiner

*Primary Examiner*—Saul Rodriguez
(74) *Attorney, Agent, or Firm*—Posz & Bethards, PLC

(57) ABSTRACT

In an electromagnetic clutch having drive and driven side clutch plates in which the drive side clutch plate is provided with a plurality of elongated holes circumferentially arranged at given intervals, a depression is formed by compressing and plastically press deforming each bridge portion positioned circumferentially between adjacent two of the elongated holes on an axial end surface of the drive side clutch plate facing the driven side clutch plate. Though tensile stress caused by belt tension is likely concentrated on the bridge portion, the depression, which causes higher hardness of the bridge portion, effectively serves to restrain occurrence of the fatigue failure.

4 Claims, 7 Drawing Sheets

CLUTCH INCLUDING SPUN ROTOR HAVING HARDENED DEPRESSIONS

BACKGROUND OF THE INVENTION

1. Field of the Invention

The present invention relates to a friction clutch such as an electromagnetic clutch, having a rotor including a drive side clutch plate provided with plastically press deformed depression and a method of manufacturing the rotor.

2. Description of Related Art

A friction clutch such as an electromagnetic clutch has a rotor including a drive side clutch plate and a driven side clutch plate to be attracted toward and frictionally engaged with the drive side clutch plate. Conventionally, in the electromagnetic clutch for transmitting a drive force to a compressor of a vehicle air conditioning system, the rotor including the drive side clutch plate is formed by spinning (refer to JIS B 0122) or cold forging.

Figure 7:
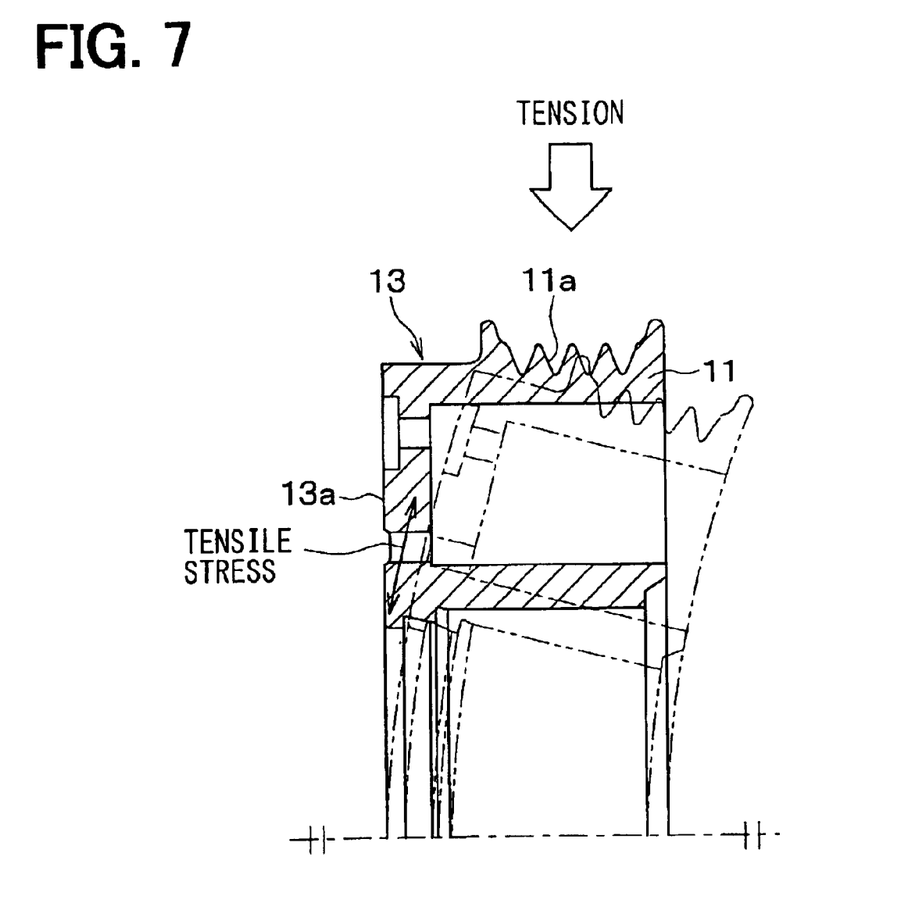
FIG. 7 is a schematic diagram of the rotor for explaining occurrence of tensile stress due to tension.

Though the rotor can be formed at less manufacturing cost (with higher productivity or inexpensive manufacturing equipment) by spinning than by cold forging, the inventors of the present invention have found on conducting a fatigue test for a purpose of comparing the rotor formed by spinning with the rotor formed by cold forging that the rotor formed by spinning is likely broken down with less load or during shorter time period than the rotor formed by cold forging. Further, an investigation of this reason reveals that a surface of the drive side clutch plate of the rotor formed by spinning is less hardened than that of the rotor formed by cold forging and, as shown in FIG. 7, when bending moment acts on a clutch plate 13 of the rotor due to belt tension applied to an outer cylindrical wall 11 of the rotor, tensile stress occurs on a friction surface 13a of the clutch plate 13. Accordingly, it can be concluded that the rotor having the friction surface 13a whose hardness is lower has weaker resistance against fatigue failure and is more easily broken down by the tensile stress applied thereto.

SUMMARY OF THE INVENTION

An object of the present invention is to provide a friction clutch which has stronger resistance against the fatigue failure so that the friction clutch has a longer life time.

To achieve the above object, in a friction clutch to which a motive force of a drive source is transmitted via a torque transmitter such as a belt and from which the motive force is intermittently transmitted to a driven device, the friction clutch has a rotor and a driven side clutch plate. The rotor has a drive side clutch plate and a cylindrical outer wall extending axially from the drive side clutch plate, which are integrally formed into a single piece. The outer wall is to be engaged with and rotatably driven by the torque transmitter. The driven side clutch plate is to be connected with the driven device and movable axially so as to be frictionally engaged with and rotated together with the drive side clutch plate.

With the frictional clutch mentioned above, the drive side clutch plate is provided with a depression formed by compressing and plastically press deforming a part of an axial end surface of the drive side clutch plate positioned on an opposite side to the outer wall with respect to the drive side clutch plate.

Since harness of the part of the axial end surface of the drive side clutch plate is enhanced by the depression, the drive side clutch plate has stronger resistance against the fatigue failure, even if tensile stress caused by tension of the torque transmitter acts on the axial end surface of the driven side clutch plate.

In case that the drive side clutch plate is provided with a plurality of holes which are circumferentially arranged at given intervals, the depression is formed on each bridge portion positioned circumferentially between adjacent two of the holes.

Though the tensile stress caused by tension of the belt is likely concentrated on the bridge portion, the depression effectively serves to restrain occurrence of the fatigue failure.

It is preferable that, after appearances of the drive side clutch plate and the outer wall are formed by spinning, the depression is formed by coining. In case that the drive side clutch plate has the holes circumferentially arranged at given intervals, it is preferable that the holes are formed by stamping and, then, the depression is formed by coining on the bride portions.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

An electromagnetic clutch 10, as a friction clutch according to an embodiment of the present invention, is described with reference to FIGS. 1 to 4B. The electromagnetic clutch 10 is used to intermittently transmit motive force of an engine to a compressor (driven device) for vehicle refrigeration system.

Figure 1:
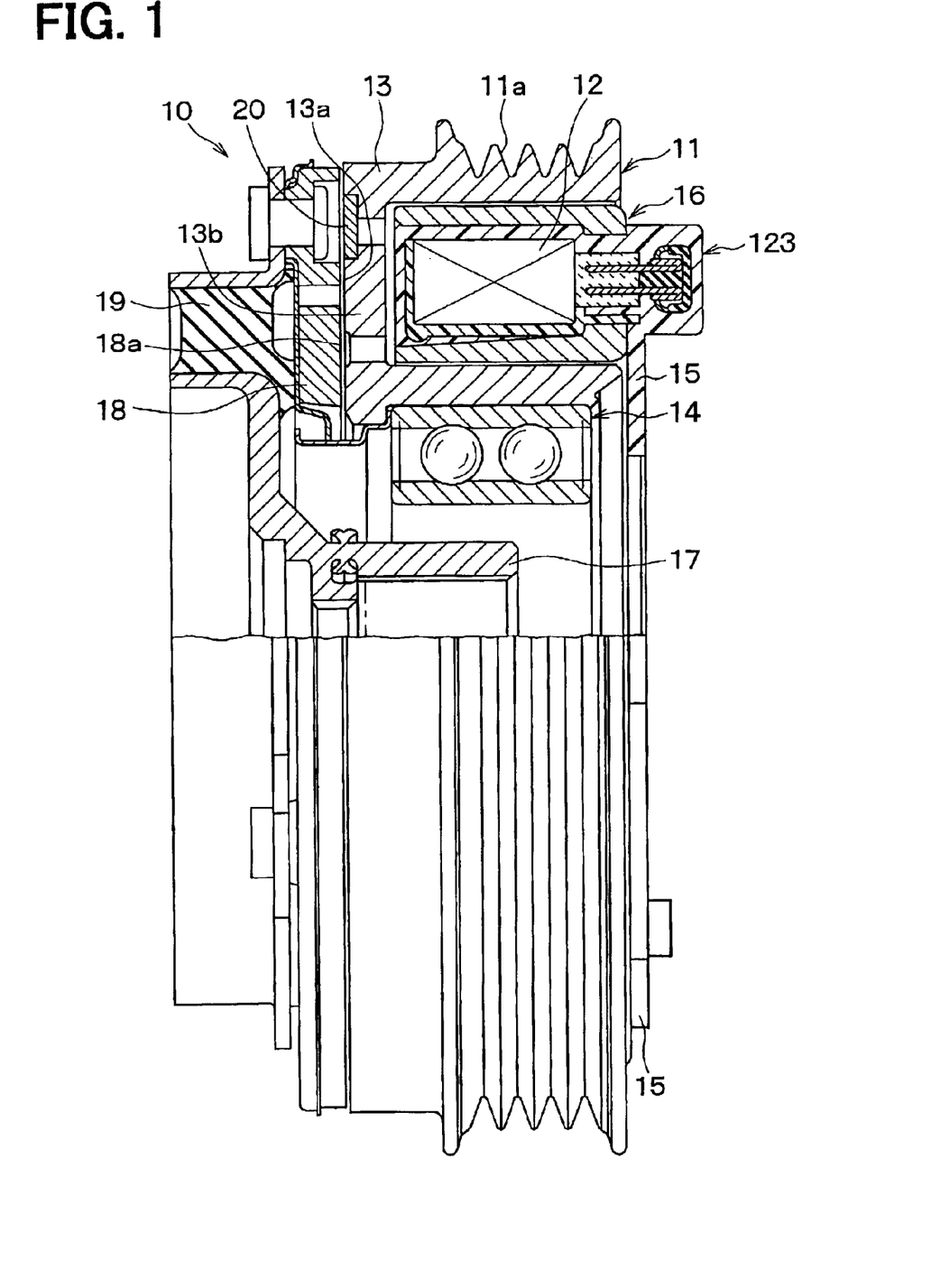
FIG. 1 is a semi-cross sectional view of an electromagnetic clutch according to an embodiment of the present invention.

As shown in FIG. 1, the magnetic clutch 10 is composed of a rotor 13, stator 16, an armature (driven side clutch plate) 18 and a hub 17.

The rotor 13 has a disk plate (drive side clutch plate) 13b and a cylindrical outer wall 11 extending axially from an outer periphery of the disk plate 13a. The disk plate 13b and the outer wall 11 are integrally formed into a single piece by spinning (refer to JIS B 0122). The outer wall 11 is provided at an outer circumference thereof with a plurality of belt grooves 11a with which a V-belt is engaged for transmitting the motive force (rotating force) of the engine to the rotor 13. The rotor 13 is rotatably held via a bearing 14 by a front housing of the compressor.

The stator 16 has a coil 12 and a disk-like plate 15. The coil 12 is fixed via the plate 15 to the front housing of the compressor so that, when the coil 12 is energized, the rotor 13 forms a magnetic circuit of the magnetic flux excited by the coil 12.

The armature 18 has an armature friction surface 18a which is attracted toward and comes in frictional contact with a rotor friction surface 13a of the disk plate 13b positioned on an opposite side to the outer wall 11 with respect to the disk plate 13b, when the coil 12 is energized.

An end of the hub 17 is connected via a resilient member 19 such as rubber with the armature 18. The other end of the hub 17 is connected through a spline engagement with a shaft of the compressor.

Each of the rotor 13 and the armature 18 is made of iron metal that is easily magnetized and has superior wear resistance characteristic. The rotor 13 is made of metal corresponding to S 10C and the armature 18 is made of cold forging rolling steel.

Figure 2:
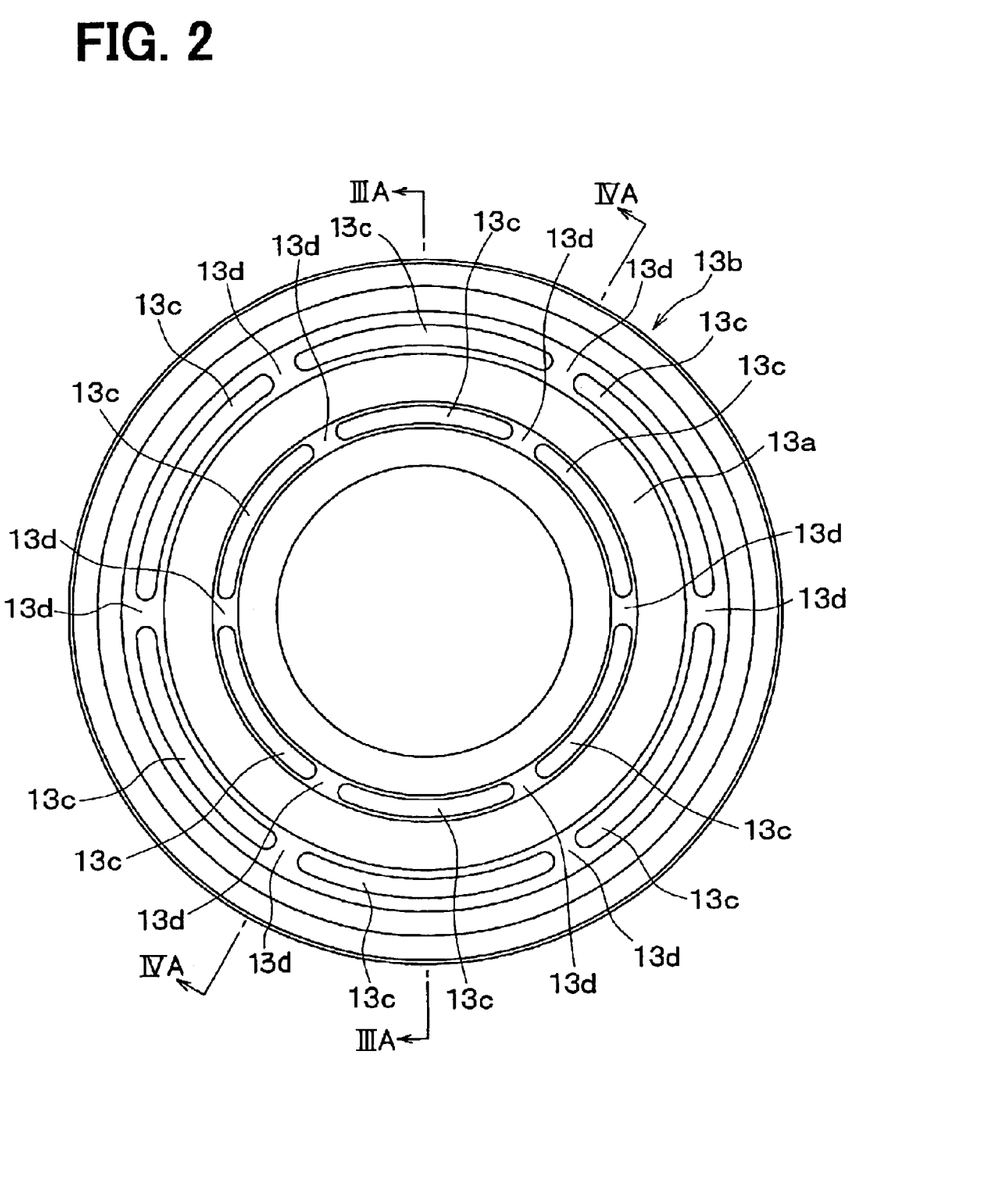
FIG. 2 is a front view of a rotor of the clutch of FIG. 1 as viewed from a side of a rotor friction surface.
Figure 3A:
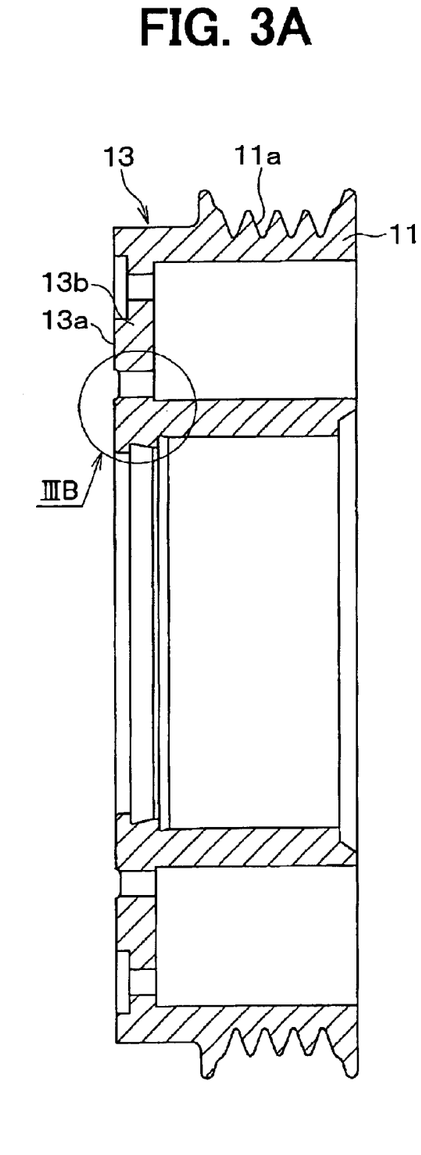
FIG. 3A is a cross sectional view of the rotor taken along a line III—IIIA in FIG. 2.
Figure 3B:
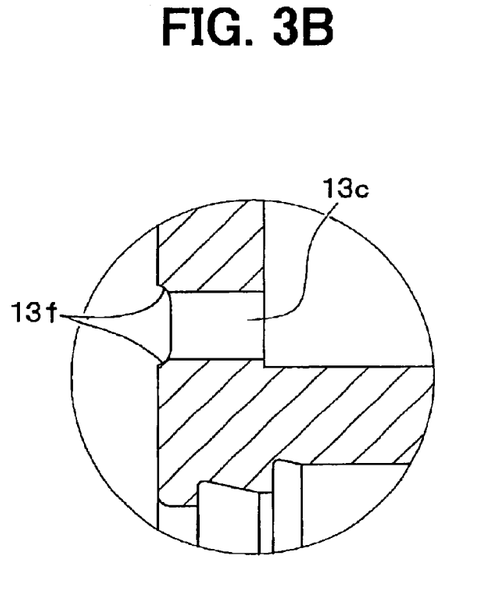
FIG. 3B is an enlarged view of a part of the rotor surrounded by a circle IIIB in FIG. 3A.
Figure 4A:
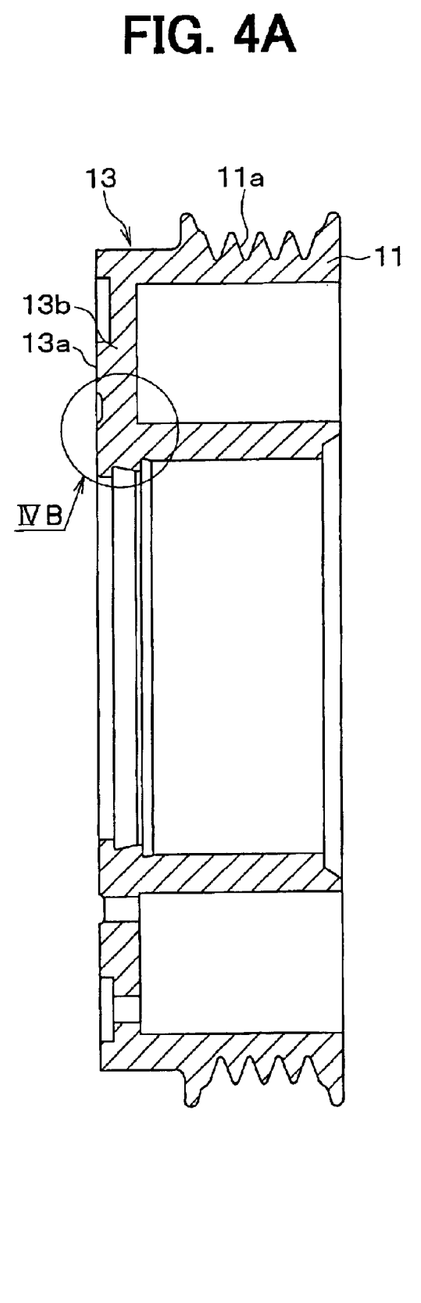
FIG. 4A is a cross sectional view of the rotor taken along a line IVA—IVA in FIG. 2.
Figure 4B:
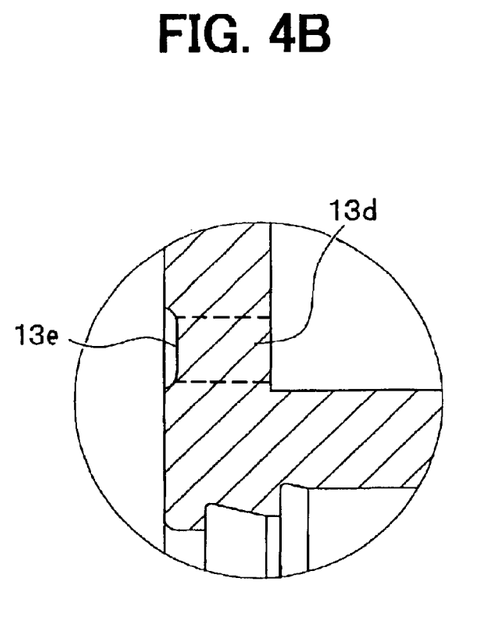
FIG. 4B is an enlarged view of a part of the rotor surrounded by a circle IVA in FIG. 4A.

As shown in FIG. 2, the disk plate 13b is provided with inner and outer rows of a plurality of elongated holes 13c each circumferentially arranged at given intervals and a plurality of bride portions 13d positioned circumferentially between adjacent two of the elongated holes 12c. As shown in FIGS. 3A to 4B, the rotor friction surface 13a is provided at circumferentially opposed peripheries of the inner row of the elongated holes 13c with chamfering 13f and at each of the bridge portions 13d with depression 13e so that the chamfering 13f and the depression 13d constitute an inner circular groove as a whole. Surface hardness of the inner circular groove is higher than that of the other part of the rotor friction surface 13a.

The rotor friction surface 13a is further provided at the outer row of the elongated holes 13c with an outer circular groove in which friction member 20 is inserted and fixed by glue.

The elongated holes 13c serve as magnetic shields which causes pass of the magnetic flux to meander through the disk plate 13b and the armature 18 so that an electromagnetic attracting force between the armature friction surface 18a and the rotor friction surface 13a is enhanced. The armature 18 is also provided with a plurality of holes serving as magnetic shields.

A method of manufacturing the rotor 13 is described below.

Figure 5A:
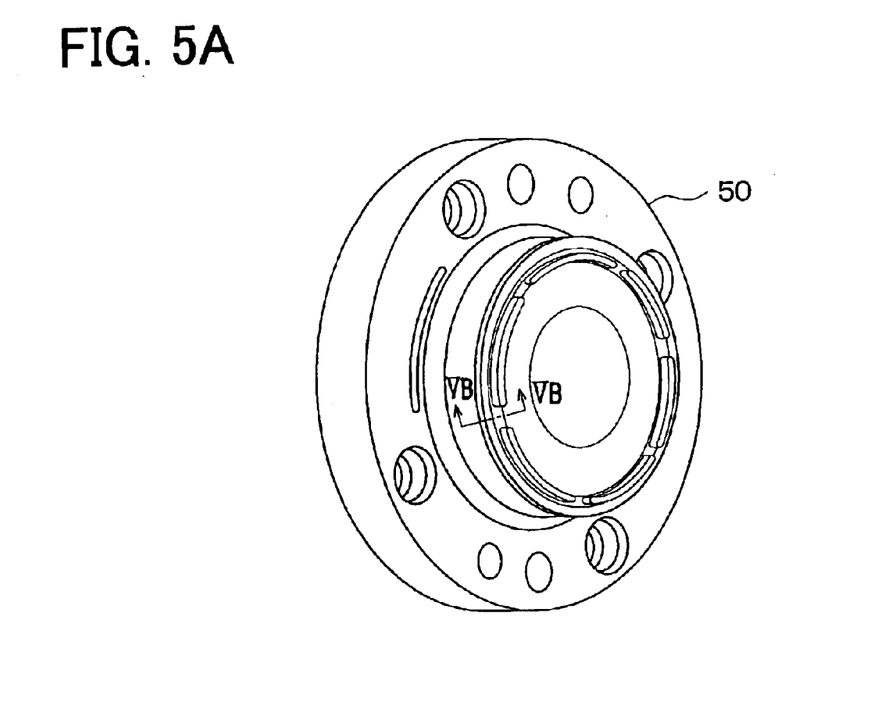
FIG. 5A is a perspective view of a metal die for plastically press deforming the rotor by coining.
Figure 5B:
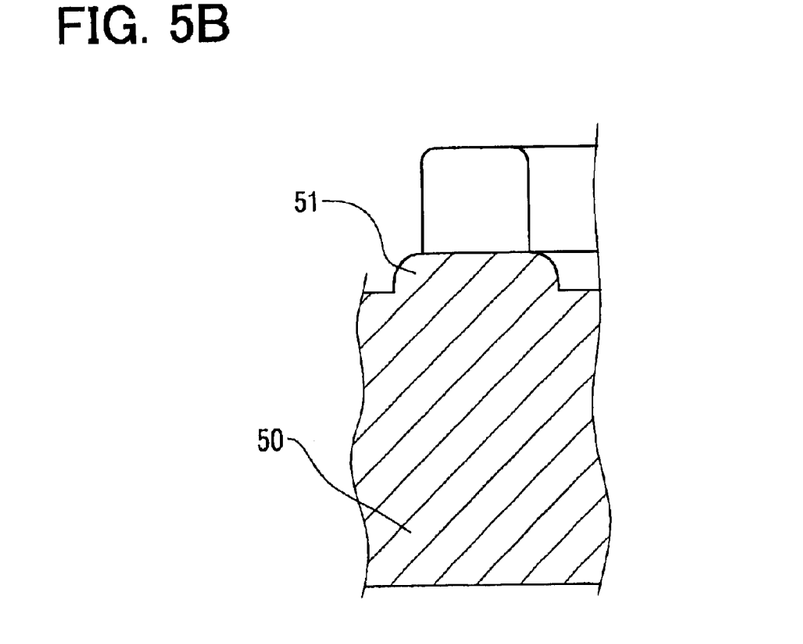
FIG. 5B is a cross sectional view of the metal die taken along a line VB—VB of FIG. 5A.

① Appearances of the disk plate 13b and the outer wall 11 are formed by spinning.
② The belt grooves 11a are formed on the outer circumference of the outer wall 11 by rolling.
③ The plural elongated holes 13c are formed by stamping.
④ The chamfering 13f and the depression 13d are formed by coining, that is, by compressing and plastically press deforming the bridge portions 13d and the circumferentially opposed peripheries of the inner row of the elongated holes 13c with a projecting portion 51 of a metal die 50 as shown in FIGS. 5A and 5B.
⑤ The rotor friction surface 13a is finished by machining so that the outer groove is formed.
⑥ An outer surface of the rotor 13 is coated with paint.
⑦ The friction member 20 is fixed by glue to the outer groove.
⑧ The rotor 13 is processed by final finish working.
⑨ The bearing is press fitted to the rotor 13.

Advantages of the present embodiment are described below.

Since the rotor friction surface 13a is positioned on an opposite side to the outer wall 11 with respect to the disk plate 13b, tensile stresses due to the belt tension occur on the rotor friction surface 13a. However, the rotor friction surface 13a is provided with the depression 13e formed by compressing and plastically press deforming a part of the rotor friction surface 13a (by coining) so that hardness of the rotor friction surface 13a at the depression is higher. Accordingly, occurrence of fatigue failure of the rotor 13 is restrained, which results in longer life time of the electromagnetic clutch.

In particular, though the tensile stresses due to the belt tension are likely concentrated on the bridge portions 13d positioned circumferentially between adjacent two of the holes 13c, the depression 13e formed by coining at each of the bridge portions 13d effectively restrains the fatigue failure of the rotor 13.

Though the chamfering 13f and the depression 13e are formed simultaneously according to the present embodiment, it is sufficient enough to form only the depression 13e for a purpose of restraining the occurrence of fatigue failure.

According to the present embodiment, the depressions 13e are formed by coining at the bridge portions 13d positioned between the adjacent two of the inner raw of the holes 13c. This is due to a reason that the tensile stress due to the belt tension is larger at each of the bridge portions 13d positioned between the adjacent two of the inner raw of the holes 13c than at each of the bridge portions 13d positioned between the adjacent two of the outer raw of the holes 13c and the tensile stress occurring at the each of the bridge portions 13d positioned between the adjacent two of the outer raw of the holes 13c is not so large to an extent of causing the fatigue failure of the rotor 13. However, if the belt tension is larger, it is preferable that the bride portions 13d between adjacent two of the outer raw of the holes 13c are also provided with depressions 13e formed by coining.

According to the present embodiment, though the disk plate 13b is provided with the elongated holes 13c and the bride portions 13d, the depressions 13e may be formed by coining on the disk plate 13b having no elongated holes 13c or on the disk plate 13b whose elongated holes 13c is filled with non-magnetic material.

Further, instead of the elongated holes 13c, the disk plate 13b may have a plurality of round holes circumferentially arranged at given intervals.

Furthermore, even if a rotor is formed by cold forging, the depressions 13e may be formed by coining on the rotor having a disk plate and an outer wall, which are similar as those of the present embodiment, unless hardness of the disk plate 13b is sufficiently enhanced by the cold forging.

Figure 6:
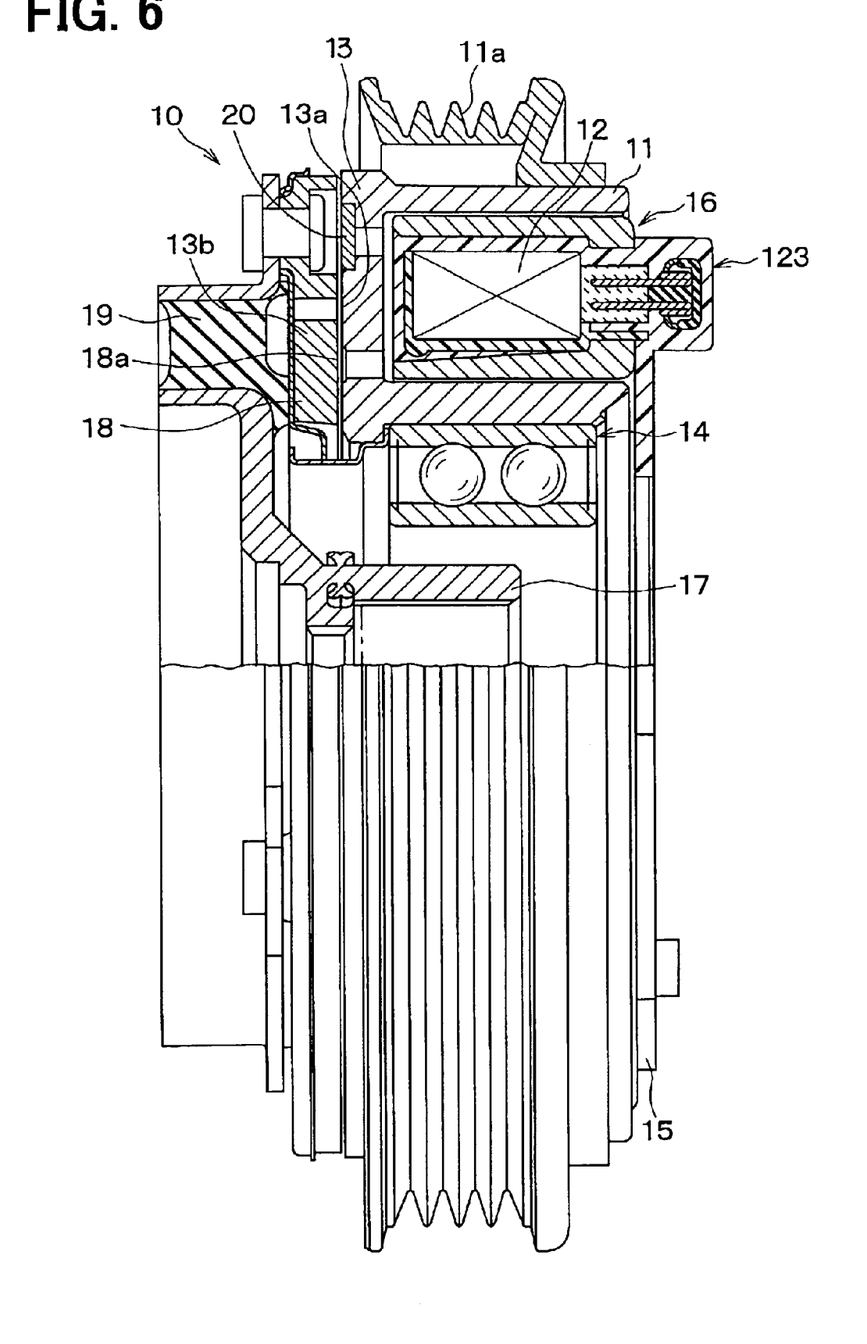
FIG. 6 is a semi-cross sectional view of an electromagnetic clutch according to a modification of the embodiment of FIG. 1.

Moreover, instead of roller forming the belt grooves 11a on the outer circumference of the outer wall 11, a pulley having the belt grooves 11a may be mounted on the outer circumference of the outer wall 11, as shown in FIG. 6.

Further, instead of positioning the outer wall 11 on an opposite side to the rotor friction surface 13a with respect to the disk plate 13b, the outer wall 11 may be positioned on the same side as the rotor friction surface 13a with respect to the disk plate 13b. In this case, the depression 13e is formed by coining on a surface of the disk plate 13b axially opposite to the rotor friction surface 13a, to which the tensile stresses are applied by the belt tension.

Still further, instead of the V-belt through which the motive force of drive source is transmitted to the rotor 13, any toque transmitter such as a belt with teeth or a chain may be used for motive force transmission.

What is claimed is:

1. A friction clutch to which a motive force of a drive source is transmitted via a torque transmitter and from which the motive force is intermittently transmitted to a driven device, comprising:

a rotor having a drive side clutch plate and a cylindrical outer wall extending axially from the drive side clutch plate, wherein the drive side clutch plate and the cylindrical outer wall are integrally formed into a single piece by spinning, the outer wall being engageable with and rotatably driven by the torque transmitter; and a driven side clutch plate to be connected with the driven device and movable axially so as to be frictionally engaged with and rotated together with the drive side clutch plate, wherein the drive side clutch plate is provided with a depression formed by compressing and plastically press deforming a part of an axial end surface of the drive side clutch plate positioned on an opposite side to the outer wall with respect to the drive side clutch plate, so that the hardness of the drive side clutch plate at the depression is higher than that of the remainder of the drive side clutch plate.

2. A friction clutch according to claim 1, wherein the drive side clutch plate is provided with a plurality of holes, which are circumferentially arranged at given intervals, and the depression is one of a plurality of depressions formed respectively on bridge portions positioned circumferentially between adjacent pairs of the holes.

3. A friction clutch according to claim 1, further comprising a coil positioned on an axially opposite side to the driven side clutch plate with respect to the drive side clutch plate, wherein the driven side clutch plate is attracted toward and comes in frictional contact with the axial end surface of the drive side clutch plate on which the depression is formed, when the coil is energized.

4. A friction clutch according to claim 1, wherein the drive side clutch plate is made of iron metal corresponding to S 10C.

* * * * *